(12) United States Patent
Deladurantaye et al.

(10) Patent No.: US 6,795,611 B2
(45) Date of Patent: Sep. 21, 2004

(54) LIGHT COUPLING BETWEEN A LIGHT SOURCE AND AN OPTICAL WAVEGUIDE

(75) Inventors: Pascal Deladurantaye, Levy (CA); Alain Cournoyer, Québec (CA); Yves Taillon, St-Augustin-de-Desmaures (CA); Stéphane Petit, Québec (CA); Marc Deladurantaye, Charlesbourg (CA)

(73) Assignee: Institut National D'Optique, Quebec (CA)

( * ) Notice: Subject to any disclaimer, the term of this patent is extended or adjusted under 35 U.S.C. 154(b) by 56 days.

(21) Appl. No.: 10/354,642

(22) Filed: Jan. 29, 2003

(65) Prior Publication Data

US 2004/0146241 A1 Jul. 29, 2004

(51) Int. Cl.[7] ................................................ G02B 6/26
(52) U.S. Cl. .......................................... 385/31; 385/37
(58) Field of Search ........................... 385/4, 8, 10, 12, 385/14, 15, 17, 3, 1, 32, 34, 35, 130, 131; 369/44.12; 372/6

(56) References Cited

U.S. PATENT DOCUMENTS

| | | | | |
|---|---|---|---|---|
| 4,815,079 A | | 3/1989 | Snitzer et al. ................. 372/6 |
| 5,248,311 A | * | 9/1993 | Black et al. .................. 606/15 |
| 5,544,268 A | * | 8/1996 | Bischel et al. ................. 385/4 |
| 5,647,036 A | * | 7/1997 | Deacon et al. ................ 385/27 |
| 5,664,032 A | * | 9/1997 | Bischel et al. ................. 385/4 |
| 5,724,463 A | * | 3/1998 | Deacon et al. ................ 385/27 |
| 5,835,458 A | * | 11/1998 | Bischel et al. ............ 369/44.12 |
| 5,854,865 A | | 12/1998 | Goldberg ...................... 385/31 |
| 5,911,018 A | * | 6/1999 | Bischel et al. ................ 385/16 |
| 5,978,524 A | * | 11/1999 | Bischel et al. .................. 385/4 |
| 5,999,673 A | | 12/1999 | Valentin et al. ............... 385/43 |
| 6,118,908 A | * | 9/2000 | Bischel et al. ................ 385/14 |
| 6,141,465 A | * | 10/2000 | Bischel et al. .................. 385/4 |
| 6,167,169 A | * | 12/2000 | Brinkman et al. ............. 385/4 |
| 6,522,794 B1 | * | 2/2003 | Bischel et al. .................. 385/4 |

FOREIGN PATENT DOCUMENTS

WO    WO 95/10868    4/1995    ............. H01S/3/06

OTHER PUBLICATIONS

Ken–ichi UEDA et al., 1kW CW Output from Fiber–Embedded Disk Lasers; post–deadline paper CLEO 2002: (no date).

* cited by examiner

*Primary Examiner*—Akm Enayet Ullah
(74) *Attorney, Agent, or Firm*—Merchant & Gould P.C.

(57) ABSTRACT

A coupling technique for the side coupling of light from a light source into a waveguide is provided. A transversal groove is made into a section of the waveguide, extending into the target light guiding region. A coupling element is coupled to the light source at one of its end to receive the light beam therefrom. The opposite end of the coupling element is inserted in the groove and has at least one reflecting interface which specularly reflects the light beam for propagation into the waveguide. This technique may advantageously be used to couple light from the laser diodes of an array into one or a plurality of optical fibers.

24 Claims, 4 Drawing Sheets

LIGHT COUPLING BETWEEN A LIGHT SOURCE AND AN OPTICAL WAVEGUIDE

FIELD OF THE INVENTION

The present invention relates to the coupling of a light beam into an optical waveguide. More particularly, it concerns a device and method for the side-coupling of light from a light source into a waveguide, and is advantageously adapted to couple light from a laser diode array into one or a plurality of optical fibers.

BACKGROUND OF THE INVENTION

Launching of a light beam into a waveguide such as an optical fiber is one of the most basic challenges of any type of optical systems. One of the most common methods of optical coupling is the fiber pigtailing longitudinally launching a light beam into an optical fiber from one of its extremities. Fiber pigtailing however requires a precise alignment of all involved components, and most importantly, is limited to cases where a fiber extremity is available for such a coupling.

To alleviate this latter drawback, several techniques for side coupling of a light beam into an optical fiber have been developed.

For example, known in the art is U.S. Pat. No. 4,815,079 (SNITZER et al.) which is particularly directed to optical fibers for lasers and amplifiers having a single-mode core, a multi-mode inner cladding surrounding this core and an outer cladding surrounding the inner cladding. FIGS. 3 to 5 of this patent show different manners of ways for launching a light beam for propagation into the inner core of the fiber. In each case, the outer cladding is removed along a coupling length, and a coupling fiber or other device is affixed adjacent to the inner cladding. The coupling fiber is disposed along the inner cladding longitudinally in FIG. 3, and at an angle in FIG. 5. In FIG. 4, a prism is used and also disposed with one of its sides adjacent to the inner cladding. In each cases, coupling is enabled through an appropriate selection of the refractive indices, dimensions and positioning of all components.

Referring to International patent application published under no. WO95/10868 (GASPONTSEV et al.), there is also shown an arrangement for side coupling of pump radiation from a multi-mode fiber into a double-core fiber, in this case, a multi-mode coupler is formed by twisting, heating and subsequently pulling the two fibers.

Also known in the art is U.S. Pat. No. 5,999,673 (VALENTIN et al.), which particularly addresses the side coupling of a beam from a light source into an optical fiber. VALENTIN discloses the use of an intermediate feeding fiber coupled to the light source at one end and to the destination optical fiber at the other end. The feeding fiber is tapered at this latter end and fused to the other optical fiber at this tapered portion.

The above systems all allow the side coupling of a light beam in an optical fiber through the use of an intermediate fiber. In the case of radiation pumping, the light source must already be fiber based or be coupled to this intermediate fiber with the corresponding drawbacks. It would therefore be advantageous to provide a technique that allows side coupling of pump radiation inside an optical fiber without the use of an intermediate fiber.

To this effect, U.S. Pat. No. 5,854,865 (GOLDBERG) discloses a method and apparatus for side pumping of an optical fiber. GOLDBERG teaches the provision of a transversal groove, preferably V-shaped, extending into the outer core of a double core fiber. A laser diode is disposed on the opposite side of the fiber and directs light transversally into the fiber. The light rays impinge on the facets of the groove and are specularly reflected inside the outer core along the longitudinal axis of the fiber, therefore launching the light from the diode to propagate into the outer core.

One drawback of GOLDBERG's "V-groove" technique is that the focal length of the system is determined by the radius of the fiber, and that generally the various parameters of the coupler are determined by the fiber construction and geometry. In addition, this technique is practical only for coupling light from a single diode into the fiber, and is not adapted for coupling light from a plurality of sources such as the laser diodes of an array.

OBJECTS AND SUMMARY OF THE INVENTION

It is therefore an object of the present invention to provide a practical technique for the side coupling of a light beam into an optical fiber.

It is another object of the present invention to provide a coupling element adapted for realising such a technique.

It is a preferred object of the invention to allow side coupling of light from a laser diode array into one or a plurality of optical fibers.

In accordance with a first aspect of the present invention, there is therefore provided an optical coupling device for coupling light emitted by an array of laser diodes into at least one waveguide. This device includes a substrate, and a plurality of waveguide sections of the at least one optical waveguide affixed to the substrate in a parallel relationship with each other. Each of the waveguide sections has a light propagating layer extending along a longitudinal axis, and a groove extending therein transversally to this longitudinal axis. The groove reaches into the light propagating layer.

The device also includes a coupling element for coupling light from a plurality of laser diodes of the array into the waveguide sections. The coupling element has a first end optically coupled to the plurality of laser diodes for receiving the light therefrom, and a second end extending in the groove of each of the plurality of waveguide sections. The second end has at least one reflection interface oriented to reflect the light to propagate into the light propagating layer of the corresponding waveguide section.

According to another object of the invention, there is also provided a coupling element for coupling light emitted by a light source into a waveguide having a light propagating layer extending along a longitudinal axis and a groove extending therein transversally to the longitudinal axis, this groove reaching into the light propagating layer.

The coupling element includes a first end shaped to receive the light from the light source, and a second end shaped to be received inside the groove of the waveguide. The second end has at least one reflection interface oriented to reflect the light to propagate into the light propagating layer when the second end is inserted in the groove.

Finally, according to yet another aspect of the present invention, there is further provided a method for coupling light emitted by a light source into a waveguide having a light propagating layer extending along a longitudinal axis, the method comprising the steps of:

a) making a groove in a waveguide section of the waveguide transversally to the longitudinal axis, this groove reaching into the light propagating layer;

b) providing a coupling element for coupling light from the light source into the waveguide section, the coupling element having a first end and a second end having at least one reflection interface;

c) optically coupling the first end of the coupling element to the light source for receiving the light therefrom; and d) inserting the second end of the coupling element in the groove of the waveguide section with the at least one reflection interface oriented to reflect the light from the light source to propagate into the light propagating layer of the waveguide section.

Further aspects and advantages of the present invention will be better understood upon reading of preferred embodiments thereof with reference to the appended drawings.

DESCRIPTION OF PREFERRED EMBODIMENTS OF THE INVENTION

The present invention generally relates to the side coupling of light into an optical waveguide. Although in the illustrated embodiments and description herein below the waveguide of choice is an optical fiber, one skilled in the art will readily understand that the present invention may equally be applied to waveguides of any other appropriate geometry such as slab waveguides, strip waveguides, etc.

Figure 2:
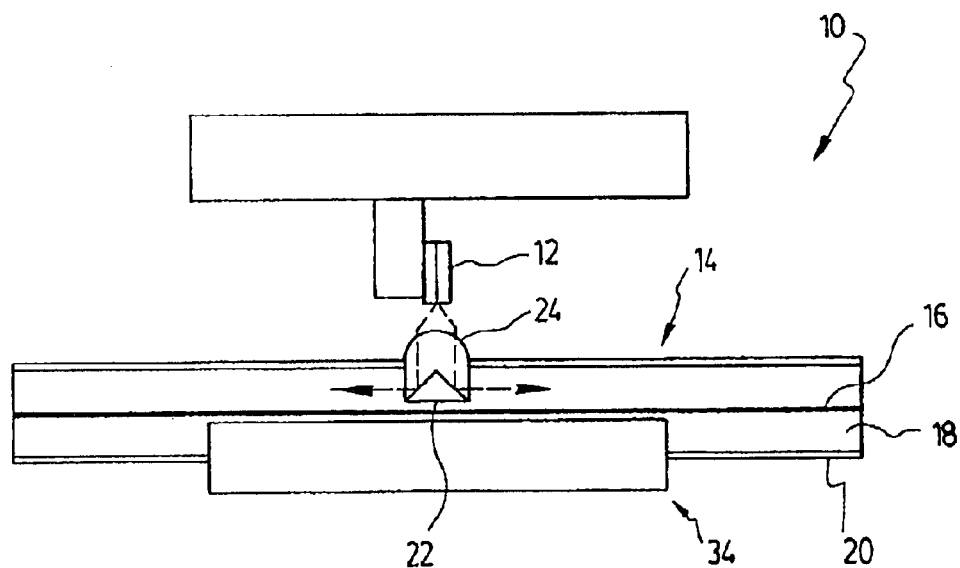
FIG. 2 is a cross-sectional side view of the device of FIG. 1.

The general principle of the present invention is better illustrated in FIG. 2, showing a system 10 coupling light from a light source 12 into an optical fiber 14. In this case, the light source 12 is a laser diode part of a diode array, as will be explained in further details herein below. It is however understood that any other appropriate type of light source may be used.

The optical fiber is preferably a "double-core" (or "double-cladding") fiber, having an inner core 16 (preferably a mono-mode core which may be doped, for example in the case of a fiber amplifier), a multi-mode outer core 18 and a cladding 20. This particular geometry is not however relevant to the invention, which applies generally to the coupling of light in a multi-mode light guiding layer of a waveguide. In the present case, this light guiding layer is embodied by the outer core 18.

A groove 22 is provided into a section of the optical fiber 14, transversally to its longitudinal axis. The groove 22 has a depth selected to reach into the light propagating layer, and therefore in the present embodiment extends both through the cladding 20 and outer core 18, without touching the inner core 16. A coupling element 24 is then provided and inserted into the groove 22. The groove 22 is preferably shaped to provide a snug fit for the coupling element 24, and in the present case is preferably rectangular shaped. The groove 22 may for example be cut in using a cutting/dicing saw, laser machined or made using any other appropriate technique or combination of techniques allowing a good precision of the groove's dimensions and a good optical quality of the surfaces.

Figure 3:
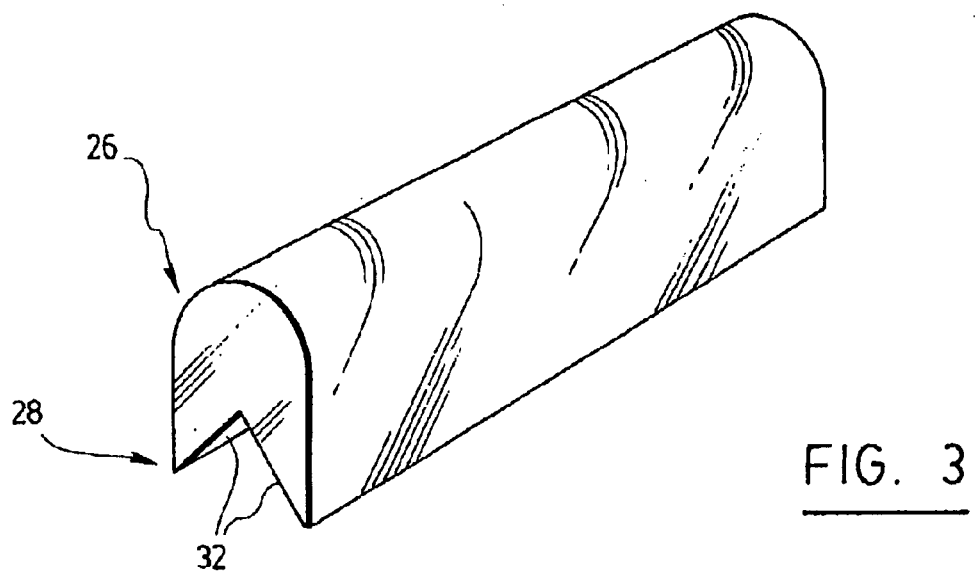
FIG. 3 is a perspective view of a coupling element of a preferred embodiment of the invention.

Referring to both FIGS. 2 and 3, the coupling element 24 has a first end 26 and a second end 28, these two portions being preferably integral to each other in a single optical component as shown in FIG. 3. The first end is coupled to the light source 12 for receiving the light beam. Preferably, the first end 26 is shaped to provide some control over the divergence of the incoming beam. In the illustrated embodiment, the first end 26 is shaped as a convex microlens and is preferably positioned to collimate the fast axis of the laser diode. The second end 28 is the portion of the coupling element 24 which is inserted inside the groove 22. It has at least one reflection interface 32 oriented to reflect the light from the light source 12 to propagate into the light propagating layer of the waveguide. Preferably, the reflection interfaces form a right angle with the longitudinal axis of the waveguide.

In the illustrated embodiment, the coupling element 24 has two reflection interfaces 32 oriented in a V-shaped relationship projecting inwardly of the coupling element 24. The light beam impinges on the inside surface of these interfaces, and is specularly reflected inside the outer core 18 of the optical fiber 14. In this manner, the light beam is launched for propagation into the optical fiber in both directions.

To enhance light coupling performance, an anti-reflection coating may be provided on the first end 26 of the coupling element 24. Additionally, a reflective coating 28 may be provided on the second end 28 of the coupling element 24.

Figure 4A:
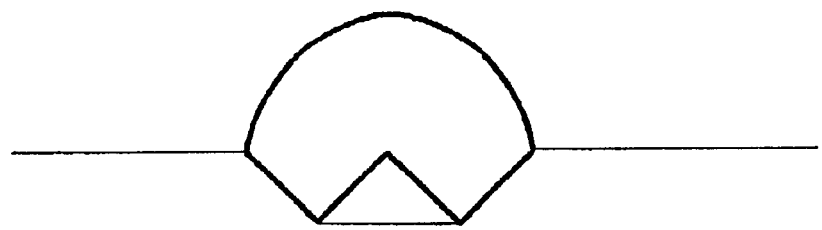
FIGS. 4A, 4B and 4C are cross-sectional views of a coupling element according to various embodiments of the present invention.
Figure 4B:
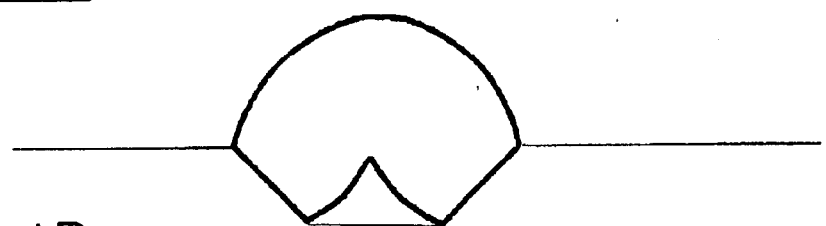
Figure 4C:
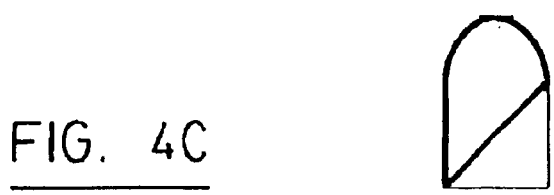

Referring to FIGS. 4A to 4C, there are shown three variants to the geometry of the second end 28 of the coupling element of FIGS. 2 and 3. Of course, numerous other configurations could also be considered. It should be noted that the number of reflection interfaces 32 may be varied, and that they may be plane (as shown in FIGS. 2, 3, 4A and 4C) or have a curvature (as for example shown in FIG. 4B). It is also of interest that the embodiment of FIG. 4C has the particularity of launching the light beam in the optical fiber along a single direction. This may be advantageous especially in the case where consecutive waveguide sections are part of a single optical fiber, since feedback in one diode from a neighbouring one is avoided. This configuration however suffers from some practical drawbacks. It is less mechanically stable, and requires a groove dept twice as large as symmetrical configurations for the same level of coupling. This may necessitate to make the optical fiber with a core offset the central axis, or an increase of the diameter of the fiber.

Figure 6:
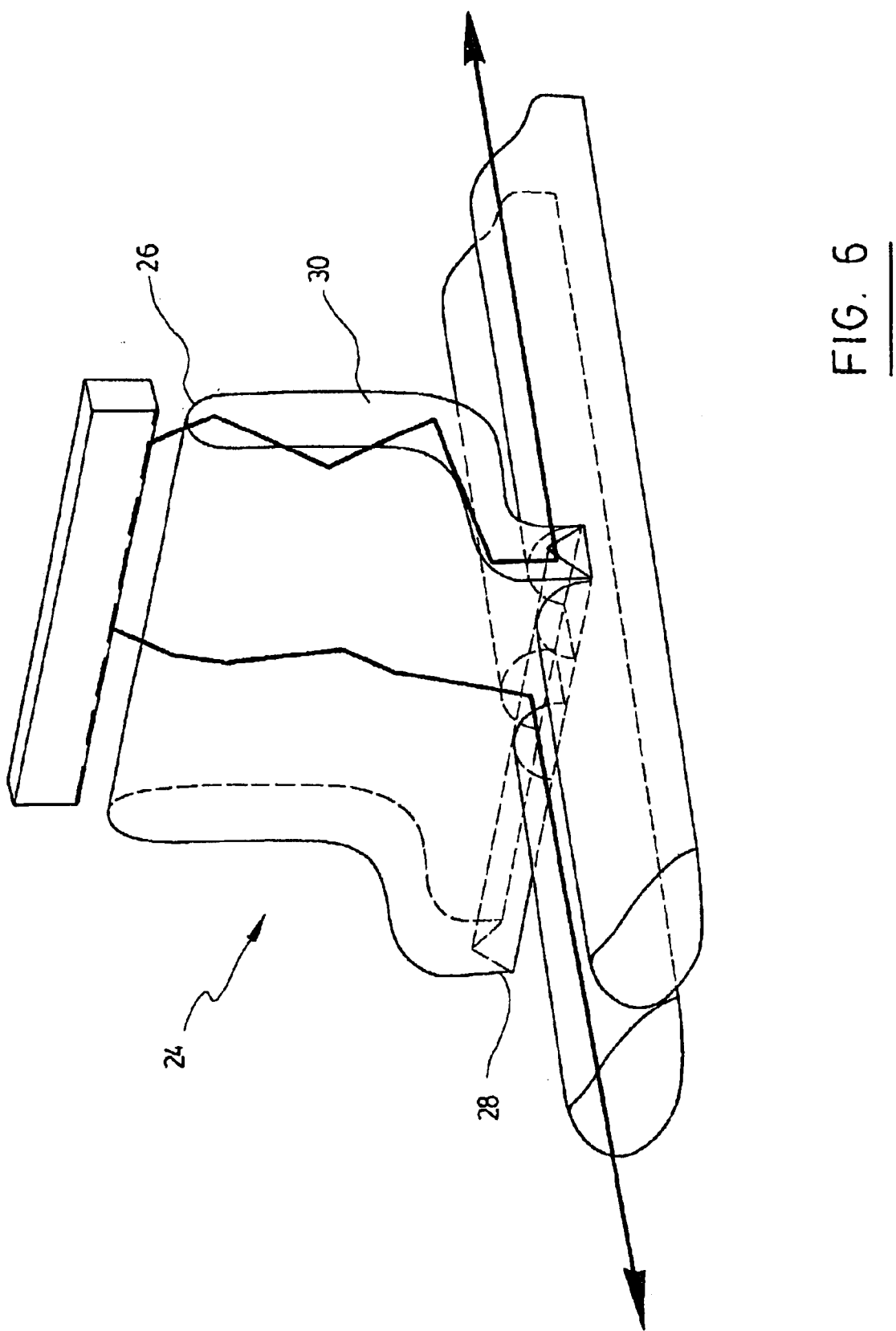
FIG. 6 is a cross-sectional perspective view of a coupling device according to yet another embodiment of the present invention.

Referring to FIG. 6, there is shown an alternate embodiment of the present invention where the coupling element 24 serves as a <<guiding lens>>. In this embodiment, the coupling element has a guiding portion 30 extending between the first end 26 and second 28, to guide the received light from one to the other. The coupling principle with this embodiment is the same as with the previously described <<fishtail>>-shaped coupling element, with the addition that the light undergoes one or a plurality of total internal reflections before reaching the second end of the coupling element. Optionally, a highly reflective coating may be provided on the reflection interface to increase coupling efficiency.

Advantageously, the guiding configuration equalises the output of the combined power from a plurality of light sources, which makes a resulting laser or fiber amplifier less vulnerable to the failure of one or a few laser diodes of an array. A very advantageous aspect of the guiding-type lens is in pumping and taking advantage of 3-level type transitions in doped fibers, particularly in double-cladding fibers. An un-pumped section of an ion-doped fiber acts as an absorbent instead of an amplifier in the case of a 3-level transition, which may even stop altogether light emission in the case of failure of one diode with the previous fishtail coupling element. The equalised output of the guiding coupling element minimises the risk of such situation since light is distributed equally between the fiber sections, whether or not there is an inoperative diode.

Figure 1:
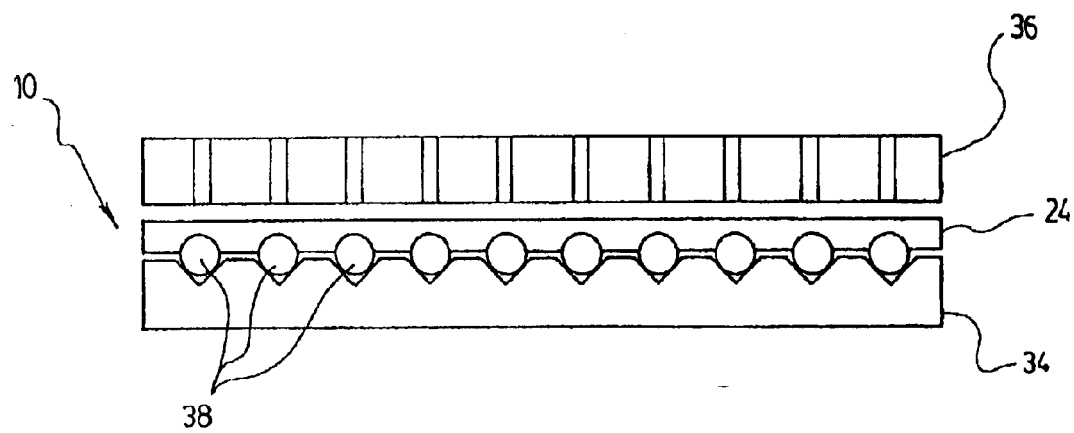
FIG. 1 is a schematic front view of a coupling device according to a preferred embodiment of the present invention.
Figure 5:
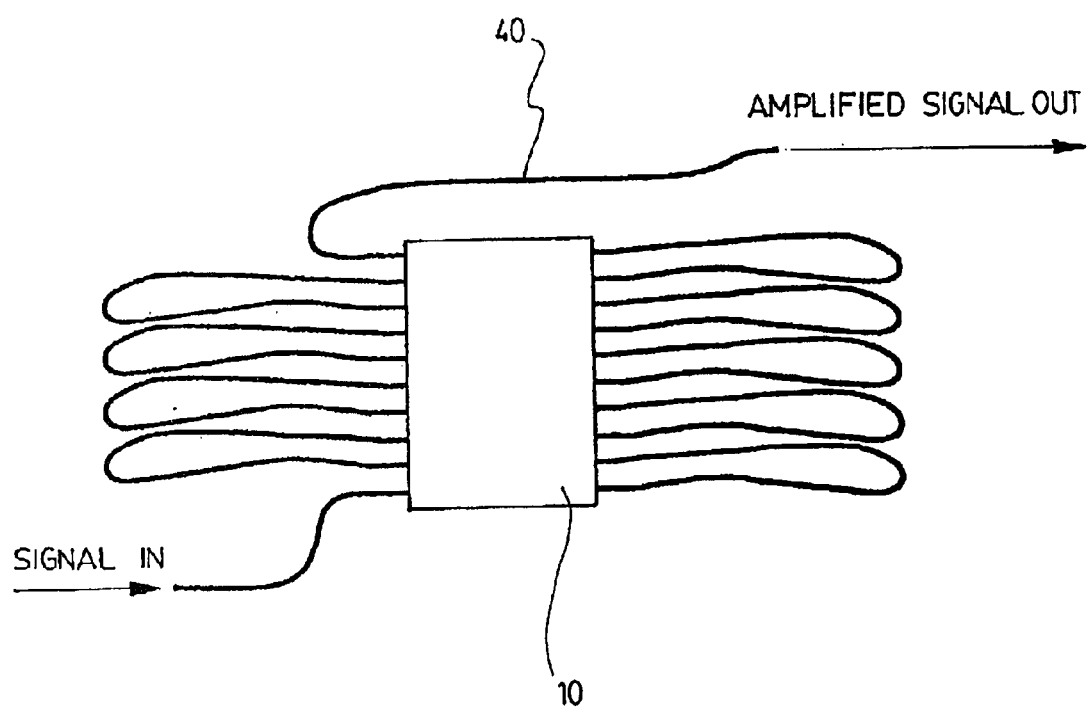
FIG. 5 is a top view of a coupling device according to another embodiment of the invention.

Now referring to FIGS. 1 and 5, there is illustrated how the light coupling technique described above is particularly advantageous for coupling light from laser diodes of an array 36 into one or several optical fibers. The number of diodes in the array is of course variable, and depending on the needs of a given situation, light from only a fraction of the total number of diodes in an array may be coupled to fiber according to the present invention.

According to this aspect of the invention, the illustrated light coupling system 10 includes a substrate 34, adapted for holding a plurality fiber sections 38 in which light from the laser diodes is to be coupled. Each of the fiber sections 38 may be from a different optical fiber, or they may all be part of a single fiber 40 as particularly illustrated in FIG. 5. In this case, particularly advantageous for pumping a fiber amplifier using the entire power of a diode array, the fiber 40 is disposed to go through the coupling system 10 at periodic intervals. Of course, various combinations of the number of diodes and fibers may be considered.

The fiber sections are affixed by conventional bonding methods to the substrate in a parallel relationship with each other. Each fiber section 38 has a groove extending transversally therein as described above, the grooves being preferably in alignment with each other. A coupling element 24 is inserted into each of the grooves as described above. Preferably, a single coupling element is used to couple light from all the laser diodes into each corresponding fiber section, but a plurality of any number of coupling elements may also be considered.

It will be readily understood by one skilled in the art that the above embodiment provides a useful way of coupling the entire power of a laser diode array inside one or a plurality of fibers without necessitating complex and precise alignment techniques as with known techniques.

Of course, numerous modifications could be made to the embodiments described above without departing from the scope of the invention as defined in the appended claims.

What is claimed is:

1. An optical coupling device for coupling light emitted by an array of laser diodes into at least one waveguide, the device comprising:
   a substrate;
   a plurality of waveguide sections of said at least one optical waveguide affixed to the substrate in a parallel relationship with each other, each of said waveguide sections having a light: propagating layer extending along a longitudinal axis and a groove extending therein transversally to said longitudinal axis, said groove reaching into the light propagating layer; and
   a coupling element for coupling light from a plurality of laser diodes of said array into said waveguide sections, the coupling element having a first end optically coupled to the plurality of laser diodes for receiving the light therefrom, and a second end extending in the groove of each of said plurality of waveguide sections and having at least one reflection interface oriented to reflect said light to propagate into the light propagating layer of the corresponding waveguide section.

2. An optical coupling device according to claim 1, wherein said plurality of waveguide sections are optical fiber sections.

3. An optical coupling device according to claim 2, wherein each of said optical fiber sections is a portion of a different optical fiber.

4. An optical coupling device according to claim 2, wherein said optical fiber sections are all portions of a single optical fiber.

5. An optical coupling device according to claim 1, wherein the substrate comprises a plurality of cavities therein for receiving the plurality of waveguide sections.

6. An optical coupling device according to claim 1, wherein the groove extending in each of said waveguide sections is rectangular-shaped.

7. An optical coupling device according to claim 1, wherein the first end of the coupling element comprises a convex lens portion collimating the light received from the plurality of laser diodes.

8. An optical coupling device according to claim 1, wherein the second end of the coupling element comprises two of said at least one reflection interface arranged in a V-shaped relationship inwardly of said coupling element.

9. An optical coupling device according to claim 1, wherein said at least one reflection interface of the coupling element forms a right angle with the longitudinal axis of each of said waveguide sections.

10. An optical coupling device according to claim 1, wherein the coupling element further comprises a guiding portion extending between the first and second ends, said guiding portion guiding the light received at the first end towards the second end.

11. An optical coupling device according to claim 1, further comprising an anti-reflection coating provided on the first end of the coupling element.

12. An optical coupling device according to claim 1, further comprising a reflective coating provided on the second end of the coupling element.

13. A coupling element for coupling light emitted by a light source into a waveguide having a light propagating layer extending along a longitudinal axis and a groove extending therein transversally to said longitudinal axis, said groove reaching into the light propagating layer, the coupling element comprising:
   a first end shaped to receive the light from the light source; and
   a second end shaped to be: received inside the groove of the waveguide and having at least one reflection interface oriented to reflect said light to propagate into the light propagating layer when said second end is inserted in said groove.

14. A coupling element according to claim 13, further comprising a guiding portion extending from the first to the second end for guiding said light therebetween.

15. A coupling element according to claim 13, wherein the first end of the coupling element comprises a convex lens portion collimating the light received from the plurality of laser diodes.

16. A coupling element according to claim 13, wherein the second end of the coupling element comprises two of said at least one reflection interface arranged in a V-shaped relationship inwardly of said coupling element.

17. A coupling element according to claim 13, wherein said at least one reflection interface of the coupling element forms a right angle with the longitudinal axis of each of said waveguide sections.

18. A coupling element according to claim 13, further comprising an anti-reflection coating provided on the first end of the coupling element.

19. A coupling element according to claim 13, further comprising a reflective coating provided on the second end of the coupling element.

20. A method for coupling light emitted by a light source into a waveguide having a light propagating layer extending along a longitudinal axis, the method comprising the steps of:
   a) making a groove in a waveguide section of said waveguide transversally to the longitudinal axis, said groove reaching into the light propagating layer;
   b) providing a coupling element for coupling light from the light source into said waveguide section, the coupling element having a first end and a second end having at least one reflection interface;
   c) optically coupling the first end of the coupling element to the light source for receiving the light therefrom; and
   d) inserting the second end of said coupling element in the groove of the waveguide section with said at least one reflection interface oriented to reflect the light from the light source to propagate Into the light propagating layer of the waveguide section.

21. A method according to claim 18, wherein the making a groove of step a) comprises using a technique selected from the group comprising cutting, laser machining and combinations thereof.

22. A method according to claim 18, wherein step c) comprises aligning the first end of the coupling element with a fast axis of the light source.

23. A method according to claim 18, wherein step c) further comprises providing a microlens assembly between the light source and the first end of the coupling element.

24. A method according to claim 18, wherein step d) comprises orienting the at least one reflection Interface at a right angle to said longitudinal axis.

* * * * *